United States Patent [19]

Richards

[11] Patent Number: 4,913,265

[45] Date of Patent: Apr. 3, 1990

[54] VEHICLE IMMOBILIZING DEVICE

[76] Inventor: Nigel W. Richards, 1-3 School Street, Wolston, Nr. Coventry, West Midlands, England

[21] Appl. No.: 384,863

[22] Filed: Jul. 21, 1989

Related U.S. Application Data

[63] Continuation of Ser. No. 125,250, Nov. 25, 1987, abandoned.

[30] Foreign Application Priority Data

Nov. 25, 1986 [GB] United Kingdom ............... 8628183

[51] Int. Cl.⁴ .............................................. B60R 25/00
[52] U.S. Cl. ..................................... 188/32; 70/226; 70/259
[58] Field of Search ............... 188/32, 5; 70/225, 226, 70/227, 228, 259, 237

[56] References Cited

U.S. PATENT DOCUMENTS

| 2,102,469 | 12/1937 | Lyon | 70/259 |
| 3,695,071 | 10/1972 | West | 188/32 X |
| 4,649,724 | 3/1987 | Raine | 188/32 |

FOREIGN PATENT DOCUMENTS 2095141 9/1982 United Kingdom ............... 70/259

Primary Examiner—Andres Kashnikow
Assistant Examiner—Matthew C. Graham
Attorney, Agent, or Firm—Gifford, Groh, Sprinkle, Patmore, & Anderson

[57] ABSTRACT

A device for immobilizing vehicles is secured to a vehicle wheel to prevent the wheel rotating. A central carrier plate carries three arms which extend outwards and have portions which embrace the outer edge of the wheel when operative. Two of the arms are pivotally attached to the plate to each move between an operative position and inoperative stowed and fitting positions. The other arm can be adjusted in its lengthwise direction and is secured to the plate by a lock.

5 Claims, 2 Drawing Sheets

VEHICLE IMMOBILIZING DEVICE

This is a continuation of application Ser. No. 125,250 filed Nov. 25, 1987 now abandoned.

1. Field of the Invention

This invention relates to vehicle immobilising devices and in particular to devices for engaging the wheels of wheeled vehicles to prevent unauthorised use of the vehicles.

2. Description of the Relevant Art

It has been proposed to provide devices for engaging vehicle wheels to prevent the vehicles being moved particularly for the purpose of controlling the parking of vehicles. Usually such devices are not readily portable so as to be usable by the vehicle user to prevent unauthorised use of the vehicle.

SUMMARY OF THE PRESENT INVENTION

According to the invention a vehicle immobilising device comprises a wheel engaging frame, the frame including at least three arms which are movable between operative and two inoperative positions, in the operative positions the arms projecting outwardly and being spaced around and embracing a vehicle wheel. The inoperative positions include an inoperative stowed position and an inoperative fitting position. By such movement the device can be fitted and released to prevent rotation of the wheel over the ground.

Conveniently the device includes a carrier and locking structure and at least one of the arms is movable relative to the carrier to release and secure the device to the wheel, the locking means securing said arm to the carrier in the operative position.

Preferably the one arm is securable to the frame at any one of several positions according to the size of wheel to which the device is fitted. The one arm may be slidable in and out longitudinally of its length relative to the carrier between the positions.

Preferably the device comprises a pivotal connection between the carrier and each of the other two arms and these two arms pivot relative to the carrier between the operative and inoperative positions. In the operative position the arms substend at an acute angle to one another from their inner ends whereby their outer ends are spaced apart and, in the inoperative stowed position, the outer ends of the arms lie adjacent one another.

The three arms may be movable relative to the carrier to lie with the outer ends of the other two arms lying adjacent the inner end of the one arm in a stowed position, and with the one arm removed from the carrier the outer ends of this other two arms are pivotable apart to a fitting position.

Each of the arms may have towards its outer end a portion which embraces the outer part of the associated wheel when operative, and the portion has a part spaced radially outwards from the associated wheel.

Conveniently the radially inner ends of said other two arms abut the one of the arms to limit said pivotal movement when the device is in an operative position.

The carrier may include a centrally located plate arranged for location adjacent the central portion of the associated wheel in the operative position.

BRIEF DESCRIPTION OF THE DRAWING

Further features of the invention appear from the following description of an embodiment of the invention given by way of example only and with reference to the drawings, in which.

DETAILED DESCRIPTION OF THE PREFERRED EMBODIMENT OF THE PRESENT INVENTION

Figure 1:
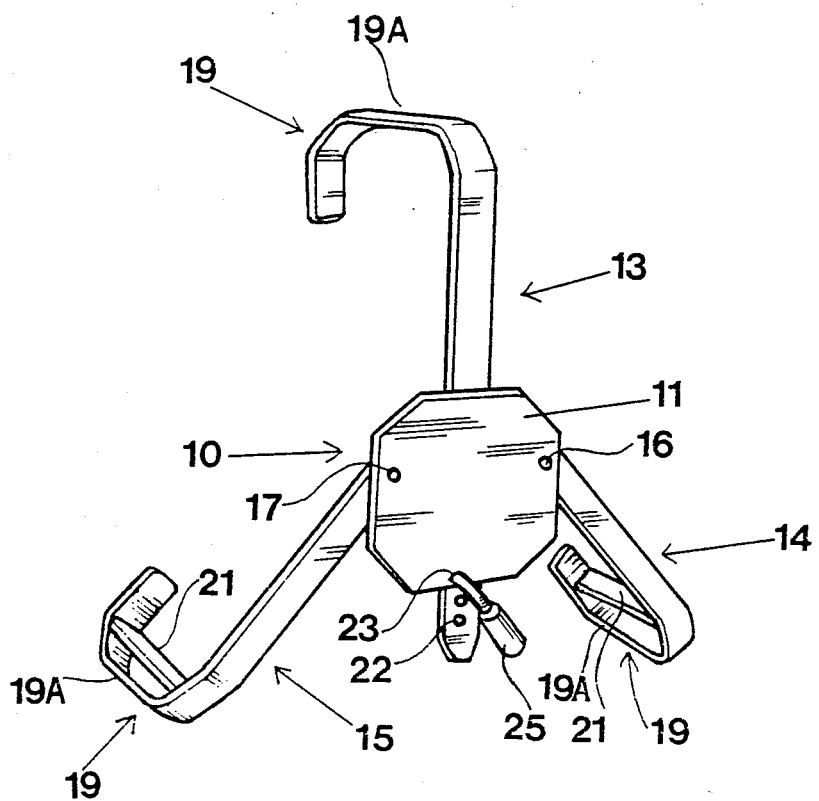
FIG. 1 is perspective view of the device from one side, when in an operative position.

Referring to the drawings a vehicle immobilising device includes a frame 10 having a central carrier plate 11. On the plate 11 are located three arms 13, 14 and 15 and two of the arms 14 and 15 are pivotally attached to the plate about pivots 16 and 17.

Figure 2:
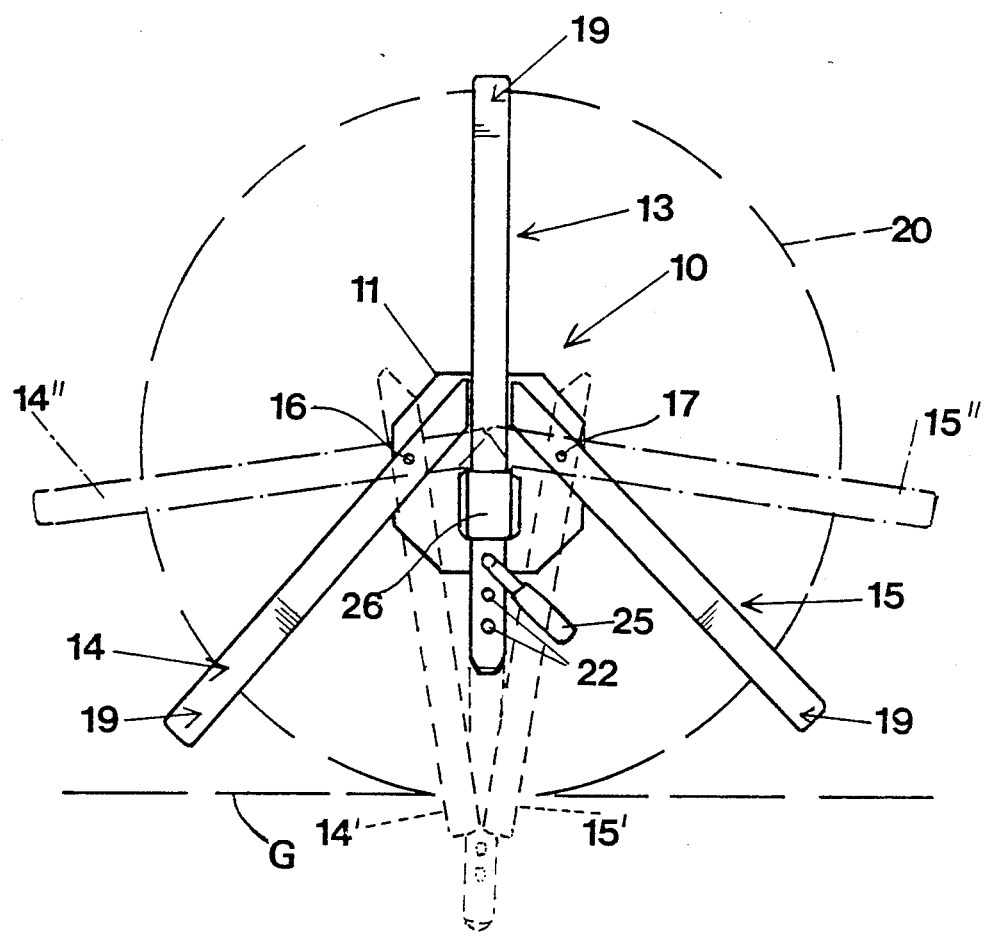
FIG. 2 is a side elevation from the opposite side showing, in full lines, the device in the operative position and, in dashed lines, the device in the inoperative, stowed position.

The pivots 16 and 17 enable the arms 14 and 15 to pivot between their operative position (FIG. 1 and the full line position of FIG. 2), an inoperative stowed position 14' and 15' and an inoperative fitting position 14" and 15".

Each of the arms 14 and 15 is similarly constructed out of a strip of steel bent round at the outer end to form a channel portion 19 which is arranged to locate around the outer part of a vehicle wheel 20. The base 19A of the channel portion 19 is in operation radially spaced from the running surface of the wheel 20 when operative and the portion 19 contains a bracing and abutment member 21 across the base. The member 21 engages or lays closely adjacent the wheel surface in use. In this way the outer ends of the arms 14 and 15 prevent the wheel from rolling over the arms when the device is operative.

The arms 14 and 15 are intended to rest on the ground G when the device is fixed to a vehicle wheel.

The central carrier plate 11 is of a shape which when positioned over the central part of the wheel 20 prevents access to the bolts (not shown) by which the wheel is normally secured to the vehicle. This prevents removal of the device by removal of the wheel from the vehicle.

The arm 13 is formed similarly to the arms 14 and 15 at its outer end having a channel portion 19 but, in this case, since the arm 13 is located over the upper part of the wheel 20 in use, the abutment member 21 can be omitted.

Towards the inner end of the arm 13 is formed a row of holes 22 lying in the longitudinal direction of the arm. The position of the arm 13 may be adjusted in its longitudinal direction relative to the plate 11 to register any one of the holes 22 with a corresponding hole 23 in the plate 11. When the device is fitted to a wheel the position of the arm 13 is adjusted until the portion 19 of the arm is engaged with or is closely adjacent to the upper part of the wheel and a locking device 25 is located through aligned holes 22 and 23. Thus the device may be secured to wheels of different sizes.

The plate 11 carries on its rear face (FIG. 2) a guide 26 in the form of a U-shaped member welded to the plate 11, the guide defining a channel through which the inner end of the arm 13 extends for supporting the arm 13 when in the operative position. The position of the arm can be adjusted and it can be moved to an inoperative stowed or inoperative fitting position when the device 25 is released. The arm 13 also supports the arms 14 and 15 in the operative position by abutment with the sides of the arm 13 by the innermost ends of the arms 14 and 15 which are shaped to effect said abutment. Thus when operative the outer ends of the arms are spaced apart and lie at an acute angle to one another. When the arms 14 and 15 are moved to the inoperative stowed position folded position, shown in dashed lines at 14' and 15' in FIG. 2, their outer ends lie generally adjacent one another and the inner end of the arm 13. In this position the device occupies little space and can readily be stowed in the vehicle.

The device is primarily intended for use by the user of a vehicle when it is to be left unattended, in order to immobilise the vehicle against theft. To place the device in position the arm 13 is removed from the guide 26 and the arms 14 and 15 are pivoted apart beyond the operative position 14 and 15 to positions 14" and 15". At these positions the arms 14 and 15 may be located to the lower sides of the wheel 20 of the vehicle. The outer ends of the arms 14 and 15 are moved towards one another at the same time raising the plate 11 until the plate is central and the arms engage the wheel. The arm 13 is then located in the guide 26 and moved inwardly until it engages the upper part of the wheel. The arm 13 is located in position by the locking device 25 which in this case is a padlock. Unauthorised use of the vehicle is thereby prevented or deterred.

Different sizes of the device for different sized wheels, in terms of width and diameter, may be provided and the device may be fitted in a matter of seconds to immobilise the vehicle.

What I claim as my invention and desire to secure by Letters Patent of the United States is:

1. A vehicle immobilising device comprising a frame for locking onto a ground engaging wheel, the frame including:
   first, second and third arms each movable between an operative position and inoperative positions and each having a wheel-embracing outer end,
   said inoperative positions including an inoperative stowed position and an inoperative fitting position,
   a carrier for the arms,
   and locking means for locking the arms in an operative position,
   the first arm being movable longitudinally of its length inwardly and outwardly of the carrier between said operative and inoperative positions, and the first arm being lockable by said locking means in the operative position relative to the carrier,
   the second and third arms each being pivotally mounted on the carrier to move between their operative position and their inoperative positions; in the operative position the second and third arms subtending an acute angle to one another from their inner ends adjacent the carrier whereby their outer ends are spaced apart and can embrace the outer part of an associated wheel to each side of a ground-engaging part of the wheel and the inner ends of the second and third arms abutting said first arm; in said inoperative fitting position the second and third arms being movable such that the outer ends can be located over the wheel to each side of the wheel, the outer ends being further spaced apart from one another in said inoperative fitting position than in said operative position and when located over the wheel the second and third arms being movable from said inoperative stowed position through said inoperative fitting position for placement over said wheel to said operative position.

2. A device according to claim 1 wherein said second and third arms are also movable to an inoperative, stowed position when released from a wheel, in which position the outer ends of the first and second arms lie adjacent one another and adjacent the inner end of the first arm.

3. A device according to claim 1 wherein the outer ends of the arms are formed of channel shape to embrace the outer edge of the wheel and at least for the second and third arms, the outer ends have each a part spaced outwards from the outermost surface of the wheel.

4. A device according to claim 1 wherein the carrier includes a plate arranged centrally of the frame in the operative position and, in use, covering the central portion of the wheel.

5. A device according to claim 4 wherein the first arm is supported for its movement relative to the carrier by a guide member and the first arm has means for locking the arm in one of several selected positions relative to the carrier according to the size of the wheel.

* * * * *

UNITED STATES PATENT AND TRADEMARK OFFICE
CERTIFICATE OF CORRECTION

PATENT NO. : 4,913,265
DATED : April 3, 1990
INVENTOR(S) : Nigel Richards

It is certified that error appears in the above-identified patent and that said Letters Patent is hereby corrected as shown below:

On the title page, insert: Item [73]:
Assignee: DAVID ANDREW BLUNDELL

Signed and Sealed this

Thirty-first Day of August, 1993

Attest:

BRUCE LEHMAN

*Attesting Officer*  *Commissioner of Patents and Trademarks*